(12) United States Patent
Cragun et al.

(10) Patent No.: US 8,319,801 B2
(45) Date of Patent: Nov. 27, 2012

(54) MAGNIFYING CONTENT ON A GRAPHICAL DISPLAY

(75) Inventors: Brian J. Cragun, Rochester, MN (US); Michael J. Fork, Gibsonburg, OH (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 12/437,950

(22) Filed: May 8, 2009

(65) Prior Publication Data

US 2010/0283800 A1 Nov. 11, 2010

(51) Int. Cl.
*G09G 5/00* (2006.01)

(52) U.S. Cl. ........................................ 345/661
(58) Field of Classification Search .................. None
See application file for complete search history.

(56) References Cited

U.S. PATENT DOCUMENTS

| | | | | |
|---|---|---|---|---|
| 4,751,507 | A * | 6/1988 | Hama et al. | 715/784 |
| 5,959,670 | A * | 9/1999 | Tamura et al. | 348/364 |
| 6,184,859 | B1 * | 2/2001 | Kojima | 345/629 |
| 6,590,583 | B2 * | 7/2003 | Soohoo | 345/660 |
| 6,636,244 | B1 * | 10/2003 | Kelley et al. | 715/781 |
| 7,084,886 | B2 * | 8/2006 | Jetha et al. | 345/620 |
| 7,194,697 | B2 * | 3/2007 | Sinclair, II et al. | 715/800 |
| 7,389,003 | B2 * | 6/2008 | Yamada et al. | 382/298 |
| 7,508,977 | B2 * | 3/2009 | Lyons et al. | 382/154 |
| 7,555,725 | B2 * | 6/2009 | Abramson et al. | 715/781 |
| 7,705,861 | B2 * | 4/2010 | Mielke | 345/642 |
| 7,800,636 | B2 * | 9/2010 | Sinclair, II et al. | 345/660 |
| 7,852,356 | B2 * | 12/2010 | Takikawa et al. | 345/660 |
| 8,120,624 | B2 * | 2/2012 | Jetha et al. | 345/647 |
| 2009/0019399 | A1 * | 1/2009 | Matsunaga et al. | 715/838 |

* cited by examiner

*Primary Examiner* — Ryan R Yang
(74) *Attorney, Agent, or Firm* — Patterson & Sheridan LLP

(57) ABSTRACT

Systems, methods and articles of manufacture are disclosed for magnifying content on a graphical display. A user may specify a selection area of the graphical display to be magnified. The user may also specify a display area of the graphical display within which to output a magnified copy of the selection area. Further, the user may anchor a selection area or a display area to an application window or to content in the application window. For instance, an anchored display area may move with an application window. The user may also specify a text size for the display area. The display area may magnify text from the selection area to the specified text size. A magnification area may also display metadata from an application window or from content in the application window. A composite view may combine multiple magnification areas.

21 Claims, 10 Drawing Sheets

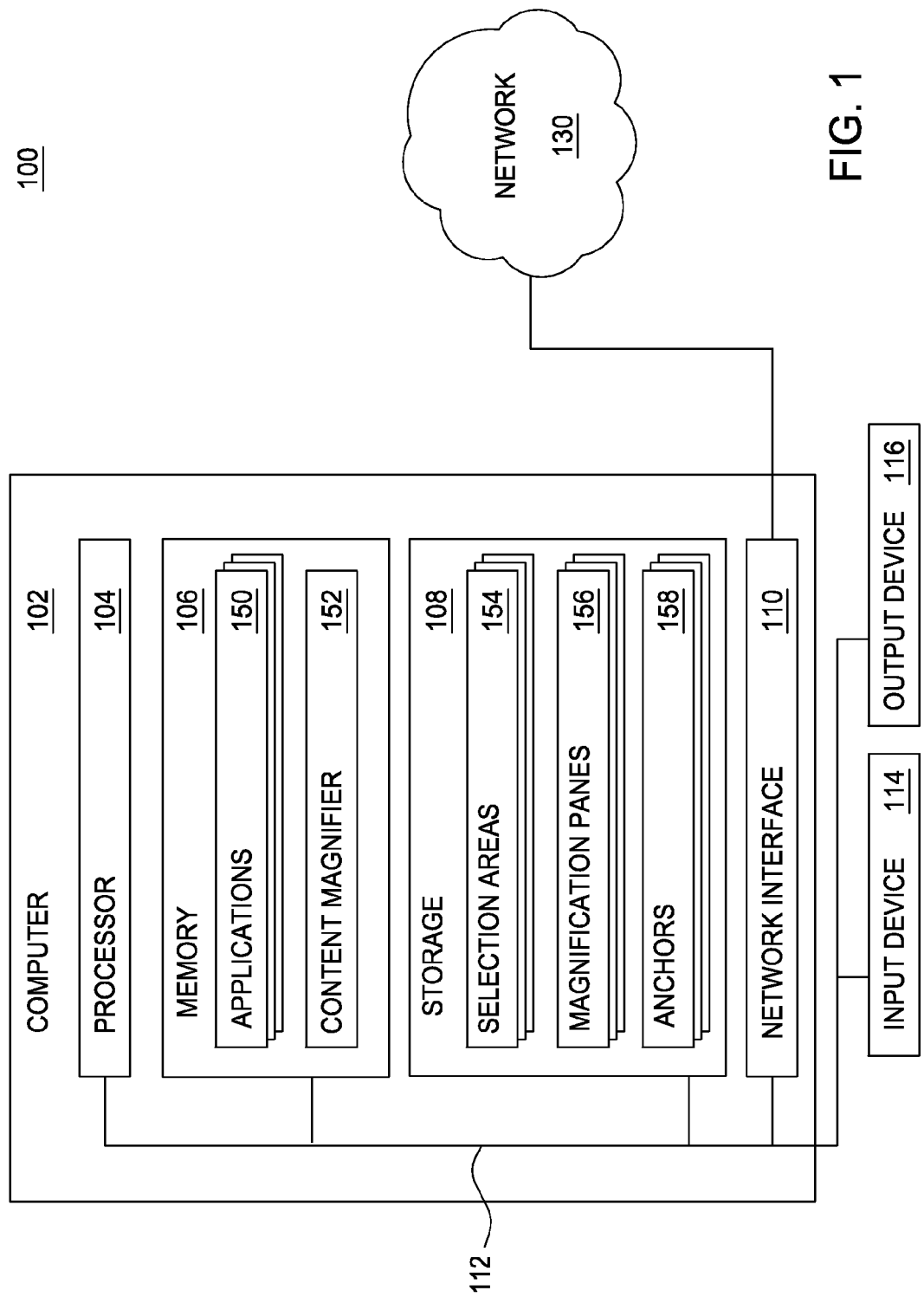

170

Screenshot I - Selection area example ~172

This example illustrates [content] to be magnified. ~182
　　　　　　　　　　　　　　　154

Screenshot II - Magnification pane example (overlays selection area) ~174

This example illustrates [onte] to be magnified. ~182
　　　　　　　　　　　　　154　156

Screenshot III - Magnification pane example (no overlap with selection area) ~176

This example illustrates [content] to be magnified. ~182
　　　　　　154　[content]
　　　　　　　　　156

FIG. 1A

Screenshot IV - Docking example ~178
Moving an application window (no docking)

Original: This example illustrates [content] to be magnified. ~182

Moved: →This example illustra[tes con]tent to be magnified. ~182

Moving an application window (with docking)

Original: This example illustrates [content] to be magnified. ~182

Moved: →This example illustrates [content] to be magnified. ~182

MAGNIFYING CONTENT ON A GRAPHICAL DISPLAY

BACKGROUND OF THE INVENTION

1. Field of the Invention

The field of the invention relates to graphical displays. More specifically, the field of the invention relates to magnifying content on graphical displays.

2. Description of the Related Art

A screen magnifier receives a graphical output and presents magnified screen content. Further, a screen magnifier may typically be a software application. Screen magnifiers are often of great help to sight impaired users. In addition, several types of screen magnifiers exist. One type of screen magnifier converts an entire screen into a magnification viewport. The user may use a mouse or keyboard to move a desktop underlying the viewport, much akin to looking through a microscope while pushing a specimen under a view of the microscope. Another type of screen magnifier converts an entire screen into a magnification viewport but also provides a thumbnail view of the entire desktop. A user may move a cursor on the thumbnail view to move the magnification viewport overlaying the desktop to a location corresponding to the thumbnail. A further type of screen magnifier provides a moveable magnifying window overlaying a desktop. The user may use a mouse or keyboard to move the magnifying window over the desktop, much akin to passing a magnifying class over a sheet of paper.

SUMMARY OF THE INVENTION

One embodiment of the invention includes a method for magnifying content on a graphical display, the method comprising configuring one or more computer processors to perform an operation. The operation may generally include receiving user input specifying a selection area of the graphical display to be magnified; specifying a display area of the graphical display within which to output a magnified copy of the specified selection area; generating the magnified copy of the specified selection area; and outputting the magnified copy of the specified selection area within the specified display area, wherein the specified selection area remains at least partially visible on the graphical display separate from the specified display area.

Another embodiment of the invention includes a method for magnifying content on a graphical display, the method comprising configuring one or more computer processors to perform an operation. The operation may generally include receiving user input specifying a plurality of selection areas of the graphical display to be magnified; specifying a display area of the graphical display within which to output magnified copies of the plurality of selection areas, wherein the specified display area includes a plurality of subdivisions; generating the magnified copies of the plurality of selection areas; and outputting the magnified copies of the plurality of selection areas within the plurality of subdivisions of the specified display area.

Still another embodiment of the invention includes a computer-readable storage medium containing a program, which when executed by the processor is configured to perform an operation for magnifying content on a graphical display. The operation may generally include receiving user input specifying a selection area of the graphical display to be magnified; specifying a display area of the graphical display within which to output a magnified copy of the specified selection area; generating the magnified copy of the specified selection area; and outputting the magnified copy of the specified selection area within the specified display area, wherein the specified selection area remains at least partially visible on the graphical display separate from the specified display area.

Yet another embodiment of the invention includes a system having a processor and a memory containing a program, which when executed by the processor is configured to perform an operation for magnifying content on a graphical display. The operation may generally include receiving user input specifying a selection area of the graphical display to be magnified; specifying a display area of the graphical display within which to output a magnified copy of the specified selection area; generating the magnified copy of the specified selection area; and outputting the magnified copy of the specified selection area within the specified display area, wherein the specified selection area remains at least partially visible on the graphical display separate from the specified display area.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a block diagram illustrating a system for magnifying content on a graphical display, according to one embodiment of the invention.

FIGS. 1A-1B illustrate screenshot listings of selection areas and magnification panes, according to one embodiment of the invention.

DETAILED DESCRIPTION OF THE PREFERRED EMBODIMENTS

Figure 2:
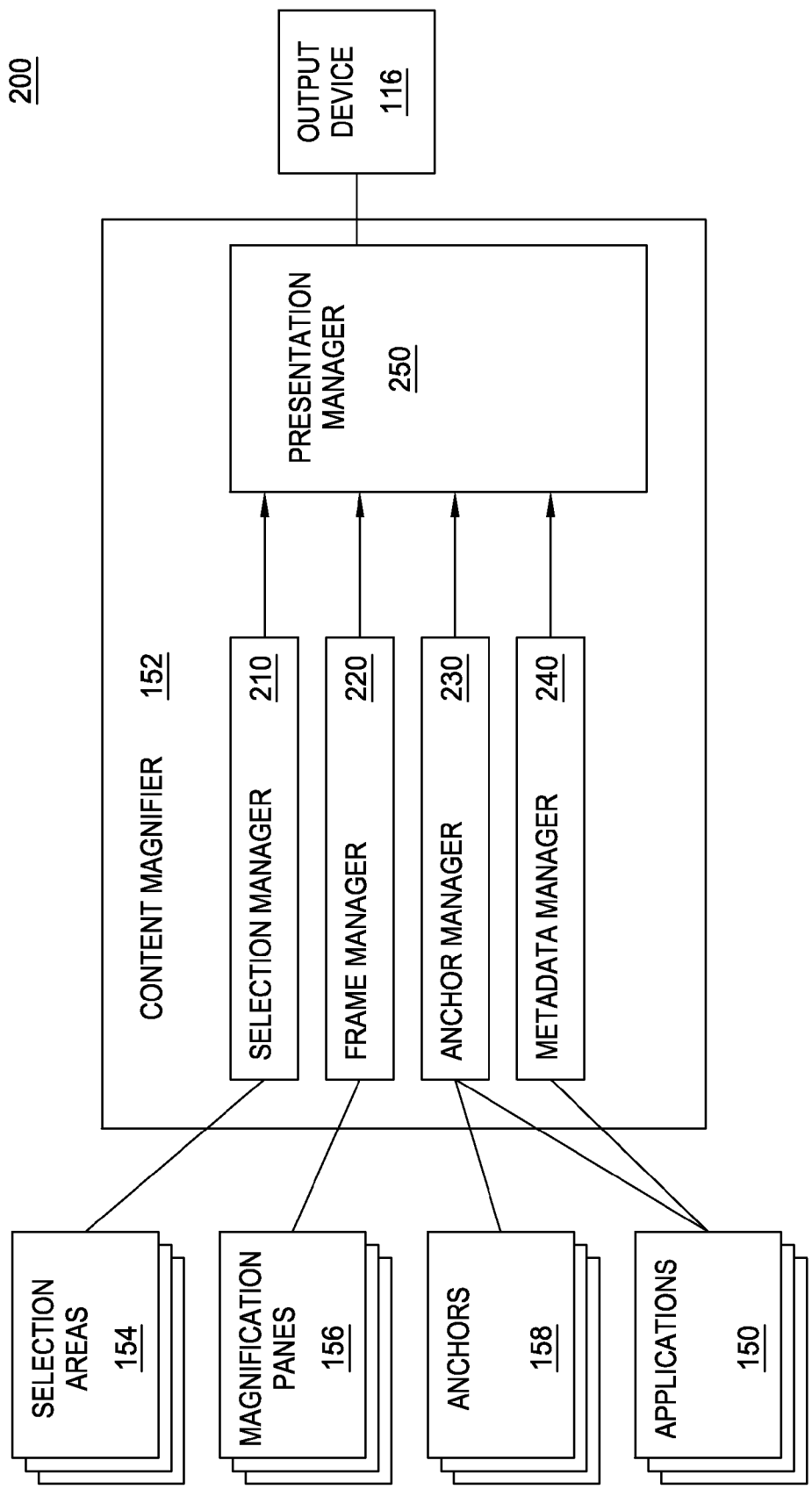
FIG. 2 is a block diagram illustrating a functional view of a content magnifier, according to one embodiment of the invention.

Embodiments of the present invention generally provide for magnifying content on a graphical display. One embodiment of the invention provides a content magnifier. The content magnifier may specify a selection area of the graphical display to be magnified, based on user input. The content magnifier may also specify a display area of the graphical display within which to output a magnified copy of the specified selection area. Further, the content manager may anchor a specified selection area (or display area) to an application window (or to content in the application window). For example, if a user moves an application window on the graphical display, a display area anchored to the application window moves also. In this way, a user repositioning a window (or document in the window) need not also reposition a magnifier overlaying the window. Further, a user may view multiple anchored parts of a document even if some parts are scrolled off-screen.

In one embodiment, the content magnifier may also specify a text size for the display area, based on user input. The content magnifier determines a magnification level by which to magnification text to the specified text size on the display area. For example, a user need not readjust a magnification level when viewing header text after viewing fine print. For a display area, the content magnifier may also output metadata from an application window or from content in the application window. Advantageously, the metadata provides context to a user viewing a display area. Further, the content magnifier may provide multiple selection areas and multiple magnification areas. In this way, a user may view multiple magnified parts of a document. Further still, the content magnifier may combine multiple magnification areas into a composite view. The composite view outputs content in the form of a "dashboard" that even a sighted user may find useful.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system for magnifying content on a graphical display, according to one embodiment of the invention. The networked system 100 includes a computer 102. The computer 102 is connected to a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used.

The memory 106 may be a random access memory. While the memory 106 is shown as a single entity, it should be understood that the memory 106 may in fact comprise a plurality of modules, and that the memory 106 may exist at multiple levels, from high speed registers and caches to lower speed but larger DRAM chips.

The network interface device 110 may be any entry/exit device configured to allow network communications between the computer 102 and other computers on the network 130. For example, the network interface device 110 may be a network adapter or other network interface card (NIC).

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used.

The output device 116 may be any device for providing output to a user of the computer 102. For example, the output device 116 may be any conventional display screen or set of speakers, along with their respective interface cards, i.e., video cards and sound cards (not shown). The output device may also include, or be used in conjunction with, text-to-speech functionality such as a screen reader application. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes applications 150 and a core content magnifier 152. Further, the storage 108 of the computer 102 includes selection areas 154, magnification panes 156, and anchors 158. FIGS. 2 through 8 and associated descriptions detail the structure and operation of the content magnifier 152 running on the computer 102.

FIGS. 1A-1B illustrate screenshot listings 170, 190 that include exemplary selection areas 154 and magnification panes 156, according to one embodiment of the invention. As shown, the screenshot listing 170 in FIG. 1A includes a selection area example 172 of screenshot I, a magnification pane example 174 of screenshot II, and a magnification pane example 176 of screenshot III. Further, the screenshot listing 190 in FIG. 1B includes a docking example 178 of screenshot IV. The screenshot listings 170, 190 of FIGS. 1A-1B are further discussed below in conjunction with FIG. 2 and its accompanying description.

FIG. 2 is a block diagram illustrating a functional view 200 of the content magnifier 152 of FIG. 1, according to one embodiment of the invention. As shown, the content magnifier 152 includes a selection manager 210, a frame manager 220, a anchor manager 230, a metadata manager 240, and a presentation manager 250.

In one embodiment, the selection manager 210 receives user input specifying a selection area 154 of a graphical display to be magnified. A selection area 154 may also be referred to as a selection pane or selection frame. Screenshot I of FIG. 1A illustrates an exemplary selection area 154 to be magnified on the graphical display. In this specific example 172, the output device 116 may be a graphical display. The input device 114 may be a pointing device (e.g., a mouse).

As shown, content 182 on the graphical display includes "This example illustrates content to be magnified." The selection area 154 includes only a word "content." For example, a user may specify a location and size of a selection area 154 by dragging and dropping a mouse cursor over an area (e.g., "content" in screenshot I of FIG. 1A) of the graphical display. Alternatively, the selection manager 210 may predefine a size for a selection area 154 (e.g., a selection frame of 400 pixels by 80 pixels). The user may then drag-and-drop the selection area 154 to a desired location on the graphical display (e.g., on the word "content" in screenshot I of FIG. 1A). Taken together, a user may specify content 182 to be magnified by specifying a selection area 154 on the graphical display via the selection manager 210. For example, the user may specify, via the input device 114, coordinates and/or dimensions for a selection area 154. The selection area 154 may be stored in the storage 108, according to one embodiment.

In one embodiment, the frame manager 220 specifies a display area of the graphical display within which to output a magnified copy of the specified selection area 154. The display area may also be referred to as a magnification area, magnification pane 156, or magnification frame. Continuing the example given in screenshot I, screenshot II of FIG. 1A illustrates an exemplary magnification pane 156 on the graphical display. In this specific example 174, the content 182 on the graphical display includes "This example illustrates content to be magnified." The magnification pane 156 magnifies the selection area 154 (i.e., the word "content" in screenshot I of FIG. 1A). Specifically, the magnification pane 156 truncates the magnified word "content," resulting only in "onte." This truncation occurs because in this particular example, the size of the magnification pane 156 is fixed to be the same size as the selection area 154. That is, because the magnification pane 156 is of fixed size in this particular example, magnified content may become larger than the magnification pane 156. Those skilled in the art will recognize, however, that embodiments of the invention may be adapted to support magnification panes of variable size (e.g., of a size specified by a user).

Although the selection area 154 is not specifically shown in screenshot II of FIG. 1A, the selection area 154 overlaps with the magnification pane 156. Specifically, the magnification pane 156 overlays the selection area 154, thereby blocking (or hiding) the selection area 154 from view on the graphical display. In other words, the selection area 154 underlies the magnification pane 156 and is therefore hidden from view on the graphical display.

In this particular example, the magnification pane 156 may not exceed the size of the selection area 154 (e.g., of screenshot I of FIG. 1A). That is, the selection area 154 limits the size of the magnification pane 156, thereby truncating the magnified word "content" in the magnification pane 156 (as shown in screenshot II of FIG. 1A).

In one embodiment of the invention, the magnification pane 156 need not completely overlap with the selection area 154. Further, the magnification pane 156 and the selection area 154 need not overlap at all. Screenshot III of FIG. 1A illustrates an exemplary magnification pane 156 that does not overlap with the selection area 154. In this specific example 176, the magnification pane 156 is associated with the selection area 154. That is, the magnification pane 156 outputs a magnified copy of the selection area 154. Further, the magnification pane 156 is also independent of the selection area 154. That is, a user may specify a size and location for the magnification pane 156 independent of the size and location of the selection area 154. For example, the user may specify, via the input device 114, coordinates and/or dimensions for a magnification pane 156. As shown, the magnification pane 156 is larger than the selection area 154 on the graphical display. Thus, the magnification pane 156 may output the magnified selection area ("content") without truncation. Further, the magnification pane 156 may be stored in the storage 108, according to one embodiment.

In one embodiment, the anchor manager 230 docks a pane to a location relative to a display element. A pane may be a selection area 154, a magnification pane 156, or both a selection area 154 and a magnification pane 156 (overlapping or non-overlapping). A display element may be an application window, content in an application window (such as a document), a desktop, etc.

Docking, or anchoring, refers to fixing the location of the pane 154, 156 relative to a display element. Screenshot IV of FIG. 1B illustrates a docking example 178. In this example 178, suppose content 182 on the graphical display includes an application window containing the following: "This example illustrates content to be magnified." Further, a selection area 154 includes the word "content." As shown, in the absence of docking, if a user moves the application window (e.g., by a few pixels to the right), the selection area 154 no longer includes the word "content," but includes truncated words "tes con" (as shown by the "no docking" example in screenshot IV of FIG. 1B). However, if the user docks the selection area 154 to the application window, the word "content" remains in the selection area 154 even if the application window is moved within the graphical display (as shown by the "with docking" example in screenshot IV of FIG. 1B).

Those skilled in the art will recognize that display elements other than application windows may be supported by embodiments of the invention. For example, a user may dock a selection area 154 to content in an application window. Suppose the user docks a selection area 154 to a location of a phrase in a document displayed in an application window. In this case, the selection area 154 may include the phrase even if the user scrolls the document in the application window (e.g., document scrolling hides the phrase altogether). That is, a selection area 154 may be anchored to content in the application window such that the selection area 154 "scrolls along with" the content in the application window. For example, a selection area may be anchored to an off-screen but frequently-updated status area of a web page in a browser window. A magnification pane 156 may be similarly anchored, according to one embodiment.

As a further example, a user may dock a magnification pane 156 to a location on a desktop. In one embodiment, a desktop size may be larger than a display size. In this example, a user may dock a magnification pane 156 to a location on the desktop. Once docked, the magnification pane 156 "pans along with" the desktop on the graphical display. That is, if a user pans the desktop on the graphical display using the input device 114, the magnification pane 156 is similarly panned on the graphical display. Put another way, if the location on the desktop is panned off-screen (i.e., outside the view of the graphical display), the magnification pane 156 may similarly be panned off-screen.

In one embodiment, an anchor 158 docks a pane 154, 156 to a display element. In one embodiment, an anchor specifies a pane 154, 156; a display element; and a location for the pane 154, 156 relative to the display element. Put another way, an anchor associates a pane 154, 156 with (a particular location relative to) a display element. Further, the anchor 158 may be stored in the storage 108, according to one embodiment. Table I shows an illustrative anchor:

TABLE I

Anchor example

| Pane: | Selection area S1 |
|---|---|
| Display element: | IBM Lotus Notes application window W1 |
| Reference point: | Top left corner of application window (Default) |
| Offset (x, y): | (+100, +100) |

As shown, the anchor 158 of Table I specifies a pane "Selection area S1", a display element "IBM Lotus notes application window W1", and coordinates (+100, +100) relative to the top left corner of the application window W1. That is, the anchor 158 docks the pane S1 to the window W1 of an IBM Lotus Notes application. Specifically, the anchor 158 docks the pane 154, 156 to a location of plus one hundred pixels along the x-axis (i.e., right) and plus one hundred pixels along the y-axis (i.e., down) relative to the reference point, which by default is top left corner of the application window. In other words, the top left corner of the application window represents the coordinates (0, 0) in this example. Further, the anchor manager 230 may also modify the reference point based on user input. For example, a user may specify any location within an application window as a reference point for an anchor 158.

The offset (+100, +100) in Table I may specify the location for a corner of the pane, an edge of the pane, a center of the pane, etc. The offset is relative to the reference point in Table I. In one embodiment, the anchor manager 230 may compute the offset from an absolute offset. For example, a user using a pointing device may click on a location, (300, 300) on the graphical display. If the top left corner of the application window is at (200, 200), the anchor manager may compute a relative offset (100, 100) from the absolute offset (200, 200).

Once selection area S1 is docked to application window W1, when the user moves application window W1 on the graphical display, the selection area S1 may move along with application window W1.

Other ways of expressing a location relative to a display element are broadly contemplated. For example, a relative location to an application window may also be expressed as a percentage of the length and/or width of the application window. That is, an anchor 158 may dock a pane 154, 156 at one-third of the application window length (from the left of the application window) and two-thirds of the application window width (from the top of the application window). In this case, if the user resizes the application window, the pane is repositioned accordingly (i.e., to maintain the one-third and two-thirds ratios relative to the application window length and width, respectively).

In one embodiment, an anchor 158 may specify additional parameters that define docking behavior. For example, the anchor 158 may specify whether a pane 154, 156 remains or is minimized when the associated display element is minimized. If minimized, a pane 154, 156 may be restored when the associated display element is restored. As a further example, the anchor 158 may specify whether a pane 154, 156 remains; becomes minimized; or is removed when associated content is scrolled off-screen. An anchor 158 may also specify a default location and/or size for a pane 154, 156 when the associated display element is no longer visible on the graphical display (due to being minimized, scrolled or moved off-screen, etc.).

In one embodiment, an anchor 158 may dock a pane 154, 156 to a location relative to a display element that places the pane 154, 156 partially or entirely outside of the display element on the graphical display. That is, a user may specify that a pane 154, 156 be anchored outside of a display element. Continuing the anchor example of Table I, suppose the coordinates of the anchor were modified to be (−100, −100). That is, the anchor 158 docks the pane 154, 156 to a location that is minus one hundred pixels along the x-axis (i.e., left) and minus one hundred pixels along the y-axis (i.e., up) relative to the coordinates of the top left corner of the application window. In other words, the pane is docked at least partially outside of the application window. As another example, if the size of an application window is 640×480 on a 1024×768 graphical display, anchor coordinates of (+0, +600) may place a pane below the application window (by 120 pixels) on the graphical display.

In one embodiment, the metadata manager 240 labels a magnification pane 156 using metadata from a display element. In some instances, a magnification pane 156 may reside outside of an associated display element. Further, a magnification pane 156 may reside outside of the display element containing an associated selection area 154. Further still, a graphical display may include multiple display elements and multiple magnification panes 156. Labeling a magnification pane 156 may reduce user confusion in these instances. For example, the metadata manager 240 may label a magnification pane 156 using a title of an application window that contains an associated selection area 154. Further, the metadata manager 240 may selectively show or hide labels for a magnification pane 156 based on user input (e.g., hotkeys). The metadata manager 240 is further discussed below in conjunction with FIG. 5 and its accompanying description.

In one embodiment, the presentation manager 250 outputs selection areas 154 and magnification panes 156 to a user via the output device 116. The presentation manager 250 receives input from the selection manager 210, the frame manager 220, the anchor manager 230, and the metadata manager 240. Further, the presentation manager 250 may provide a composite output area for a plurality of magnification panes 156. The output of the presentation manager 250 is discussed below in conjunction with FIGS. 3 through 5 and accompanying descriptions thereof.

Figure 3:
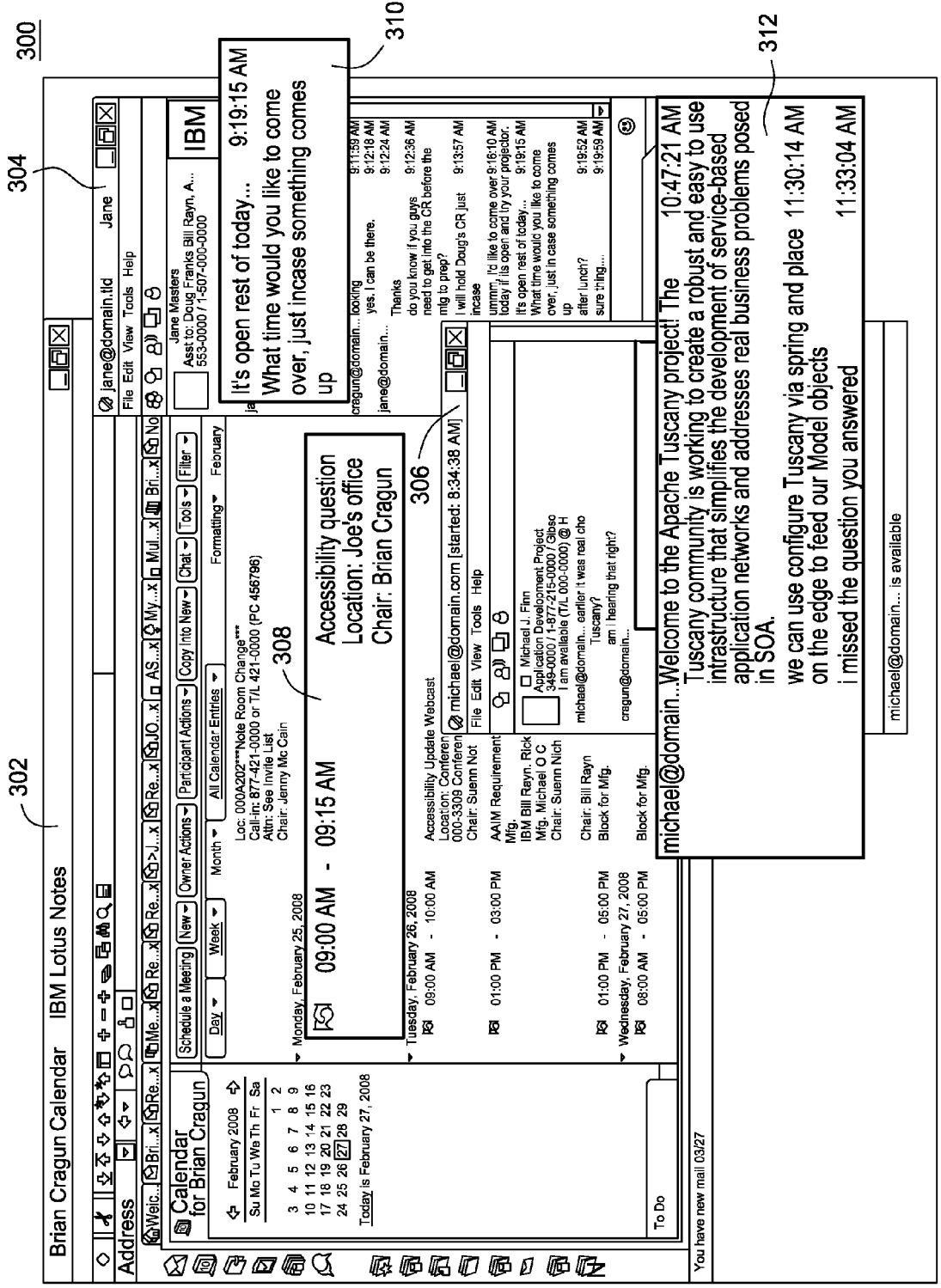
FIG. 3 illustrates a graphical user interface (GUI) that includes multiple magnification panes of a content magnifier, according to one embodiment of the invention.

FIG. 3 illustrates a graphical user interface (GUI) 300 that includes multiple magnification panes 156 of a content magnifier 152, according to one embodiment of the invention. Multiple panes allow a user to view multiple magnified areas of a graphical display simultaneously. As shown, the GUI 300 includes a first application window 302, a second application window 304, and a third application window 306. The application windows 302, 304, 306 belong to the applications 150 of FIG. 1. Further, the GUI 300 includes a first pane 308 for the first application window 302; a second pane 310 for the second application window 304; and a third pane 312 for the third application window 306. Each pane 308, 310, 312 includes a selection area 154 underlying a magnification pane 156. In other words, each pane 308, 310, 312 resembles the (combined selection/magnification) pane of screenshot II of FIG. 1A.

As shown, each pane 308, 310, 312 outputs a magnified copy of its selection area. The magnified copy of each selection area may be cropped to fit the respective pane 308, 310, 312. Further, if the pane 308 is docked to the application window 302, the pane 308 may move with application window 302 (e.g., when a user moves the application window 302). A user may also modify the location and/or size of a pane 308, 310, 312 independently of other panes 308, 310, 312. For example, the panes 308, 310 may remain in their respective locations even if the user moves the pane 312 off-screen. In another embodiment, the location and/or size of a pane 308, 310, 312 may also depend on another pane 308, 310, 312. For example, a user may move the three panes 308, 310, 312 simply by moving a single pane 308.

Figure 4:
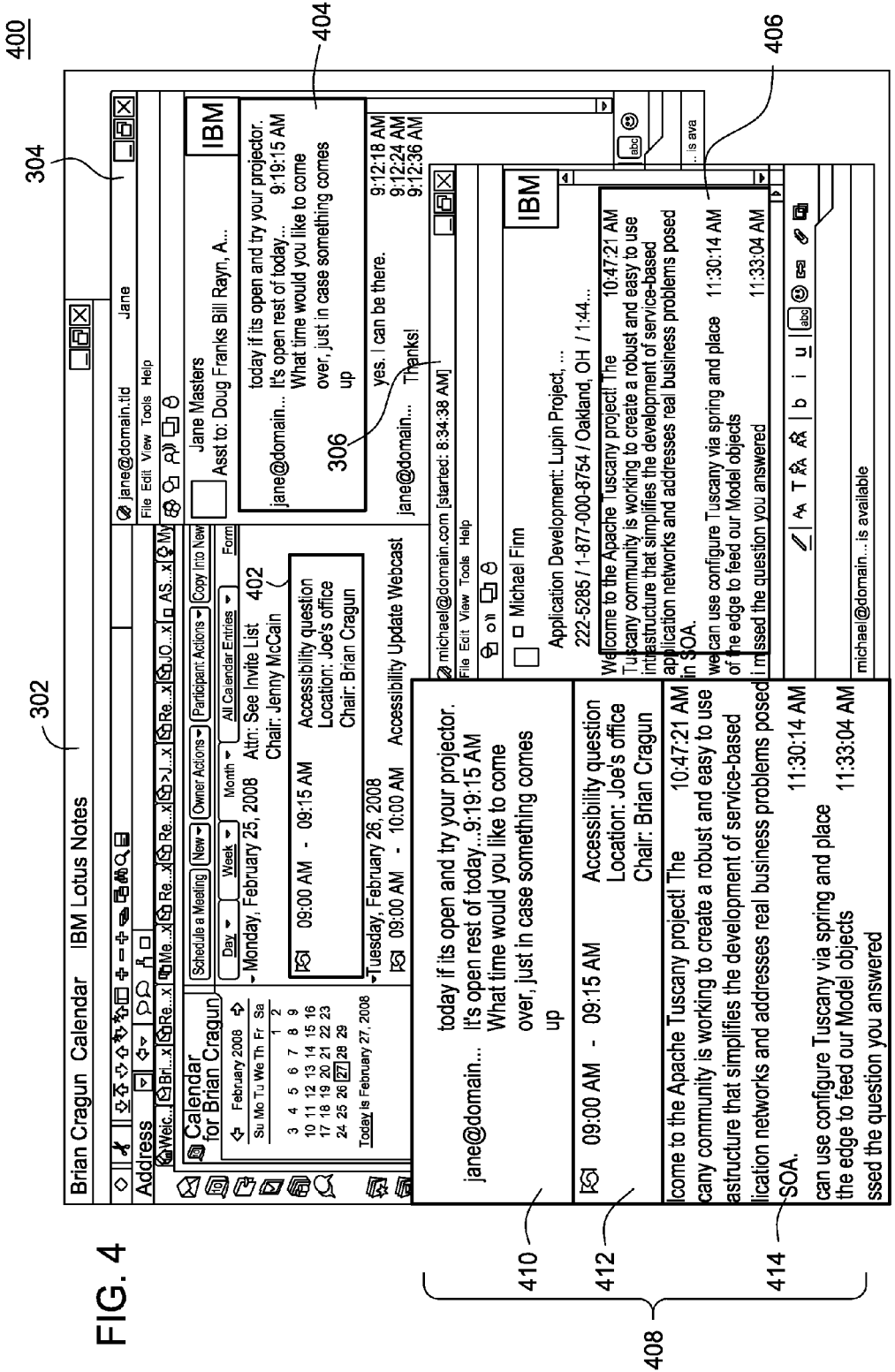
FIG. 4 illustrates a GUI that includes a composite output area of a content magnifier, according to one embodiment of the invention.

FIG. 4 illustrates a GUI 400 that includes a composite output area 408 of a content magnifier 152, according to one embodiment of the invention. As shown, the GUI 400 includes selection areas 402, 404, 406. In particular, the selection area 402 overlays the first application window 302, the selection area 404 overlays the second application window 304, and the selection area 406 overlays the third application window 306. Further, the composite output area 408 includes a plurality of subdivisions. Each subdivision includes a magnification pane 156. Specifically, the composite output area 408 includes a first subdivision containing a magnification pane 410 (associated with the selection area 404), a second subdivision containing a magnification pane 412 (associated with the selection area 402), and a third subdivision containing a magnification pane 414 (associated with the selection area 406). Taken together, each pane 308, 310, 312 from FIG. 3 is split into a magnification pane 410, 412, 414 and a selection area 402, 404, 406 in FIG. 4.

In one embodiment, the presentation manager 250 may receive user input and configure the composite output area 408. For example, the presentation manager 250 may modify the height, width, location, and number of subdivisions of the composite output area 408 based on user input. Further, the presentation manager 250 may rearrange the magnification panes 410, 412, 414 in the composite output area 408 based on user input.

In one embodiment, a frame manager 220 may receive user input specifying a text size for a magnification pane 410. The text size may be specified in pixels, as a font size, etc. The frame manager 220 may automatically adjust the magnification level of the magnification pane 410 to maintain the specified font size in the magnification pane 410 as the user moves the associated selection area 404 to overlay text of various sizes on the graphical display. Automatic adjustment of magnification levels may also be referred to as "smart magnification levels." In another embodiment, a user may specify a maximum height for a line of text. For example, a user may specify the maximum height in pixels, in inches, in centimeters, as a percentage of the graphical display height, etc.

In yet another embodiment, a user may request the frame manager 220 to detect and maintain a current maximum height of text. That is, the user need not provide any specific value representing text height (or text size). Further, a user may opt to enable or disable smart magnification levels for all magnification panes 156 or for a particular magnification pane 156.

For example, suppose that the magnification pane 410 displays twenty point font, while that the associated selection area 404 overlays twelve point font. Suppose further that a user requests the frame manager 220 to maintain the current maximum height of text in the magnification pane 410 (i.e., twenty point font). In this example, if the user moves the associated selection area 404 to overlay text of other sizes (e.g., six point, twelve point, forty point, etc.) the frame manager 220 may accordingly adjust a magnification level such that the magnification pane 410 continues to output text in twenty point font. For example, frame manager 220 may perform a pixel-by-pixel analysis of text characters and of whitespace between lines of text characters in the magnification pane 410. The frame manager 220 may use the results of the analysis to detect and maintain current text size in the magnification pane 410. Other ways of detecting and maintaining text size in the magnification pane 410 are broadly contemplated. Further, a user may also specify a text size for the composite output area 408. For example, the user may specify that all magnification panes 410, 412, 414 in the composite output area 408 should display text of a size corresponding to the text size of magnification pane 410.

Advantageously, smart magnification levels relieve a user from having to readjust a magnification level when viewing text of a different size than previously viewed text. For example, suppose a user has specified a magnification level of 20× to view fine print. If a user viewing header text after viewing fine print (e.g., by moving a selection area from the fine print to the header text), the magnified copy of header text in the magnification pane may be too large to read. When smart magnification levels is enabled, the frame manager 220 outputs text at a specified text size for the magnification pane, thereby relieving a user from having to adjust magnification levels for text of various sizes.

Figure 5:
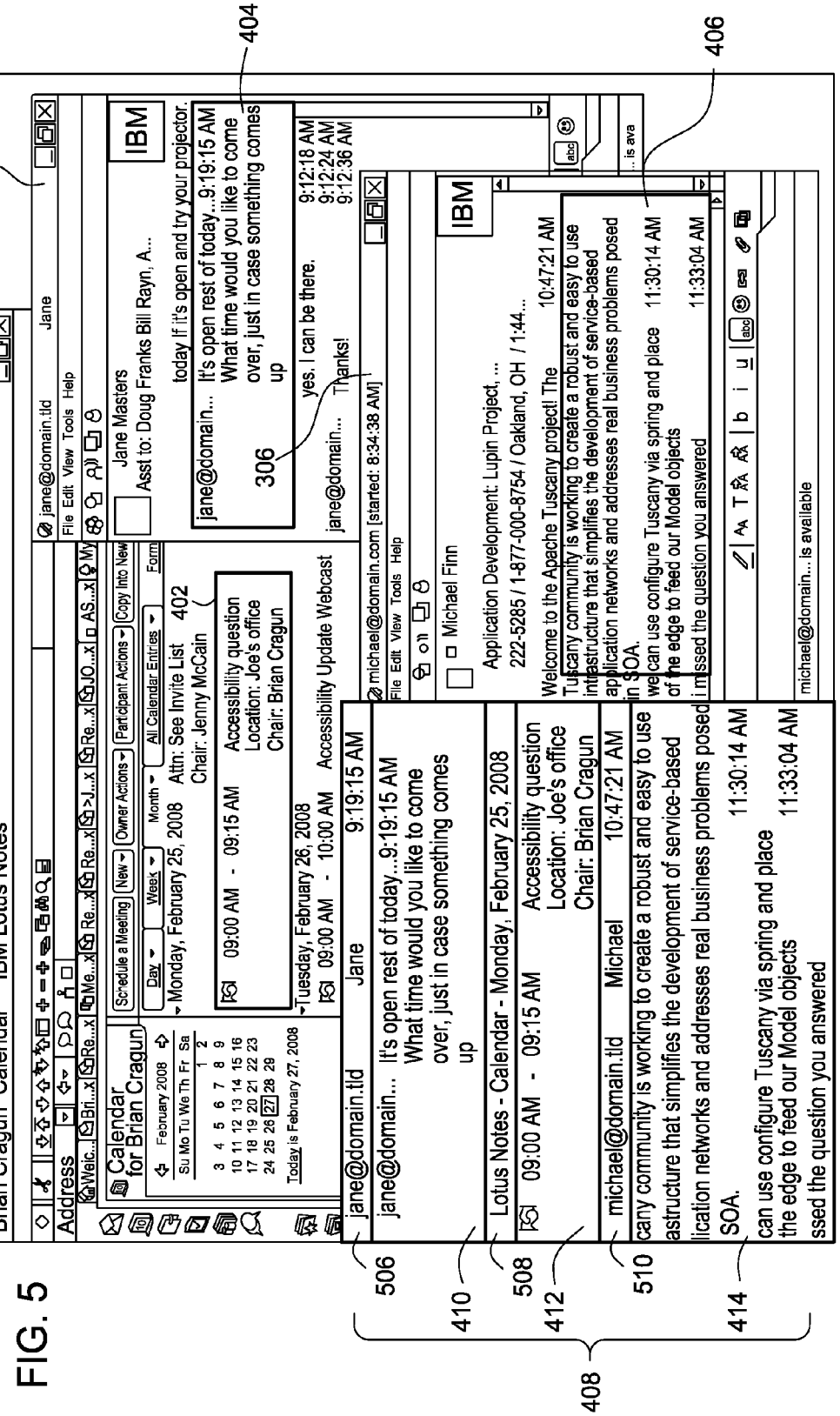
FIG. 5 illustrates a GUI that includes a composite output area of a content magnifier, the composite output area displaying application metadata, according to one embodiment of the invention.

FIG. 5 illustrates a GUI 500 that includes a composite output area 502 of a content magnifier 152, the composite output area displaying metadata of applications 150, according to one embodiment of the invention. The composite output area 502 corresponds to the composite output area 408 of FIG. 4. As shown, the GUI 500 includes a composite output area 502 that in turn includes a plurality of subdivisions. Each subdivision includes a magnification pane 410, 412, 414. Further, each magnification pane 410, 412, 414 includes metadata 506, 508, 510 of application windows 304, 302, 306, respectively. As shown, the metadata 506, 508, 510 includes titles of the respective, associated application window 304, 302, 306.

In one embodiment, the frame manager 220 provides and outputs metadata 508 for a magnification frame 412 to a user. The metadata 508 provides to a user a context for viewing the magnification frame 412. For example, the metadata 508 ("Lotus Notes—Calendar") informs a user that content in the magnification frame 412 is for a calendar entry of the IBM Lotus Notes® application. In one embodiment, the metadata 508 may include information from, or associated with, an application window, application process, application executable, etc. For example, the metadata may be obtained by calling library functions of an operating system and/or window manager running on the computer 102. In one embodiment, the content magnifier 152 may also be integrated as part of an operating system or window manager. The metadata 508 may also include metadata of content displayed by an application window (e.g., title of a web page, title and/or author of a document, etc.) Other ways of obtaining metadata from applications 150 are broadly contemplated.

Figure 6:
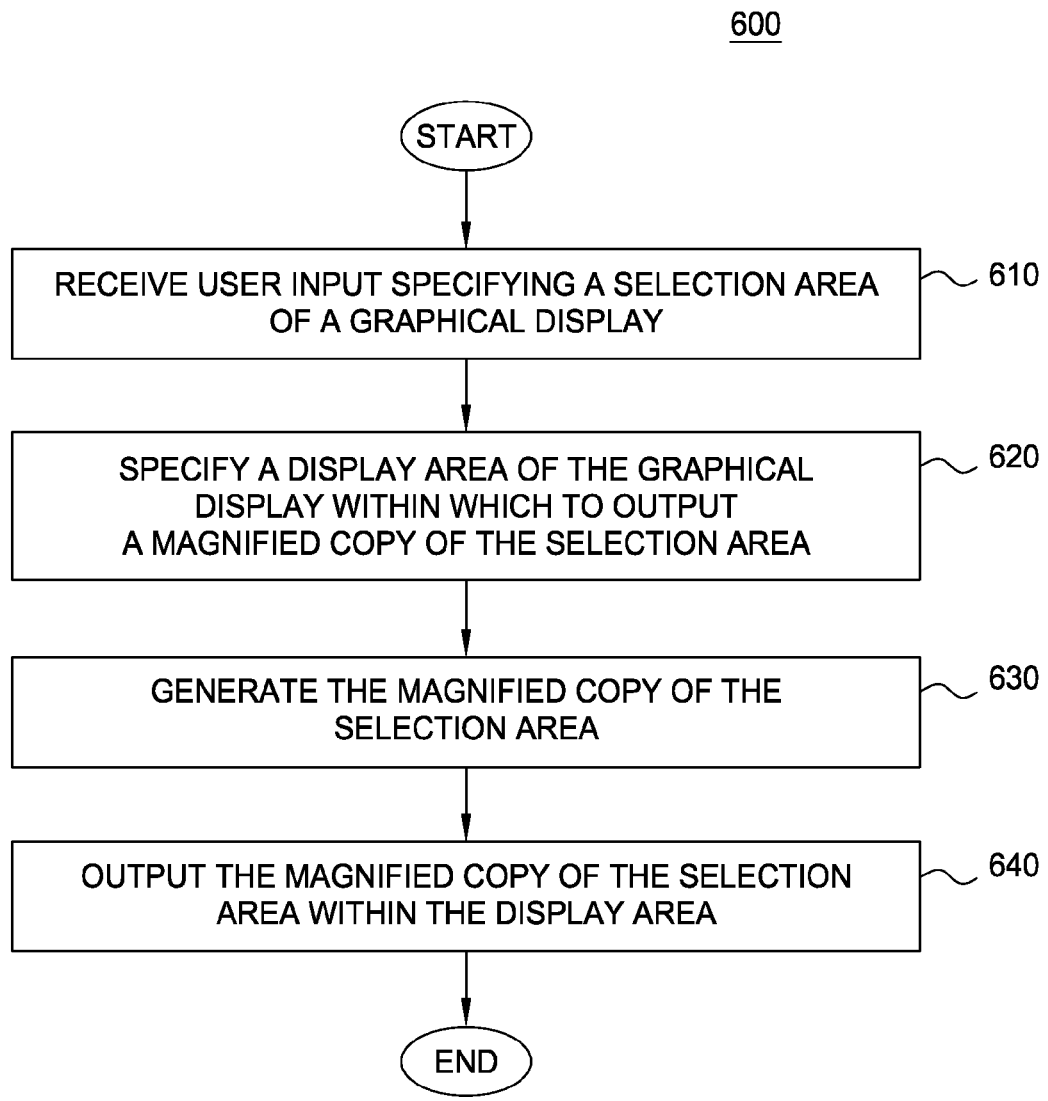
FIG. 6 is a flowchart depicting a method for magnifying content on a graphical display, according to one embodiment of the invention.

FIG. 6 is a flowchart depicting a method 600 for magnifying content on a graphical display, according to one embodiment of the invention. The method 600 may be performed by the content magnifier 152 of FIG. 1. The steps of the method 600 are described in conjunction with the pane examples of Tables I-IV and of FIGS. 3-5.

As shown, the method 600 begins at step 610, where the selection manager 210 receives user input specifying a selection area 154 of the graphical display. For example, the user may specify the selection area 154 of screenshot I, the selection area 308 of FIG. 3, or the selection area 402 of FIG. 4. At step 620, the frame manager 220 specifies a display area (i.e., a magnification pane 156) of the graphical display within which to output a magnified copy of the selection area 154. The frame manager 220 may specify the magnification pane 156 based on user input or according to a predefined setting (e.g., that specifies a location and size of the magnification pane 156). For example, the frame manager 220 may specify the magnification pane of screenshot III of FIG. 1A, the magnification pane 308 of FIG. 3, or the magnification pane 412 of FIG. 4.

At step 630, the frame manager 220 generates a magnified copy of the selection area 154. For example, the frame manager 220 may generate a magnified copy of the selection area 154 of screenshot I of FIG. 1A. As a further example, the frame manager 220 may generate a magnified copy of the selection area 402 of FIG. 4. The frame manager 220 may also adjust magnification levels so that the magnified copy includes text of a specified font size. For example, the frame manager 220 may adjust magnification levels to generate a magnified copy having twenty point font.

At step 640, the presentation manager 250 outputs the magnified copy of the selection area 154 within the display area (i.e., the magnification pane 156) of the graphical display. For example, the presentation manager 250 may output content in the magnification pane 156 of screenshot I, in the magnification pane 156 of screenshot II, in the magnification pane of screenshot III, or in the magnification pane 410 of screenshot IV. After step 640, the method 600 terminates.

Figure 7:
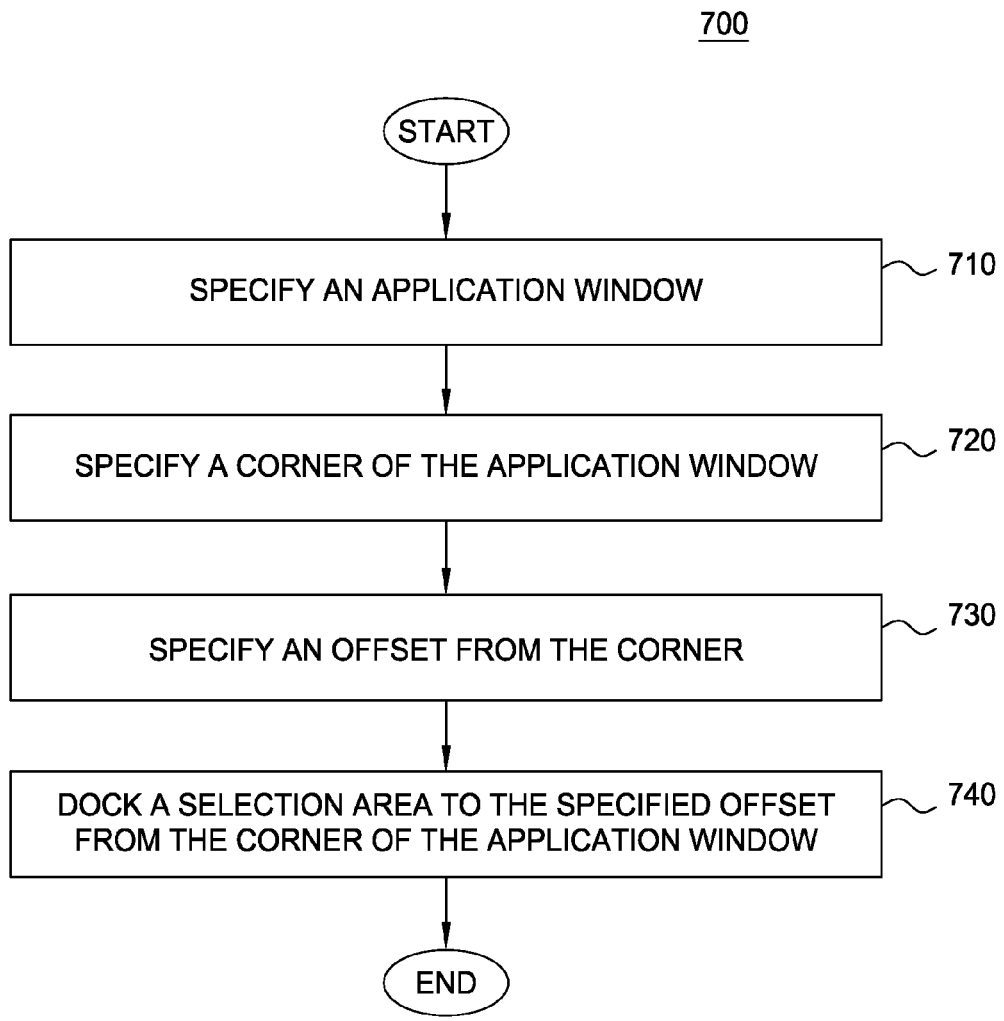
FIG. 7 is a flowchart depicting a method for docking a selection area to an application window, according to one embodiment of the invention.

FIG. 7 is a flowchart depicting a method 700 for docking a selection area 154 to a window of an application 150, according to one embodiment of the invention. The method 700 may be performed by the content magnifier 152 of FIG. 1. The steps of the method 700 are described in conjunction with the anchor example of Table I and with the pane examples of FIG. 3.

As shown, the method 700 begins at step 710, where the anchor manager 230 specifies a window of an application 150 (e.g., based on user input). For example, the anchor manager 230 may specify the application window 302 of FIG. 3. At step 720, the anchor manager 230 may specify a reference point in (e.g., a corner of) the application window. For example, the anchor manager 230 may specify the top left corner (e.g., based on user input or a predefined setting) of the application window 302 of FIG. 3.

At step 730, the anchor manager 230 specifies an offset from the reference point of the application window. For example, the anchor manager 230 may specify an offset of (+80, +290) representing plus 80 pixels along the x-axis (i.e., right) and plus two hundred and ninety pixels along the y-axis (i.e., down) from the top left corner of the application window 302 of FIG. 3. Although embodiments are described herein with reference to an anchoring scheme that specifies a pixel offset from an application window, other anchoring schemes are broadly contemplated.

At step 740, the anchor manager 230 docks, or anchors, a pane 154, 156 to the application window according to the offset from the reference point, thereby creating an "anchor" for the pane 154, 156. The pane 154, 156 may be a selection area 154, a magnification pane 156, or both. For example, the anchor manager 230 may dock the magnification pane 308 of FIG. 3 to an offset of (+80, +290) from the top left corner of the application window 302. As shown in FIG. 3, the top left corner of the magnification pane 308 is approximately at an offset of (+80, +290) from the top left corner of the application window 302. The anchor manager 230 may also store the created anchor 158 in the storage 108. For example, the anchor of Table I may be stored in the storage 108.

Once the pane 154, 156 is docked to the application window, the pane 154 156 moves with the application window (e.g., when a user moves the application window). For example, if a user moves the application window 302 in FIG. 3, the anchor manager 230 may move the magnification pane 308 along with the application window 302, thereby maintaining the offset of (+80, +290) from the top left corner of the application window 302. After step 740, the method 700 terminates.

Figure 8:
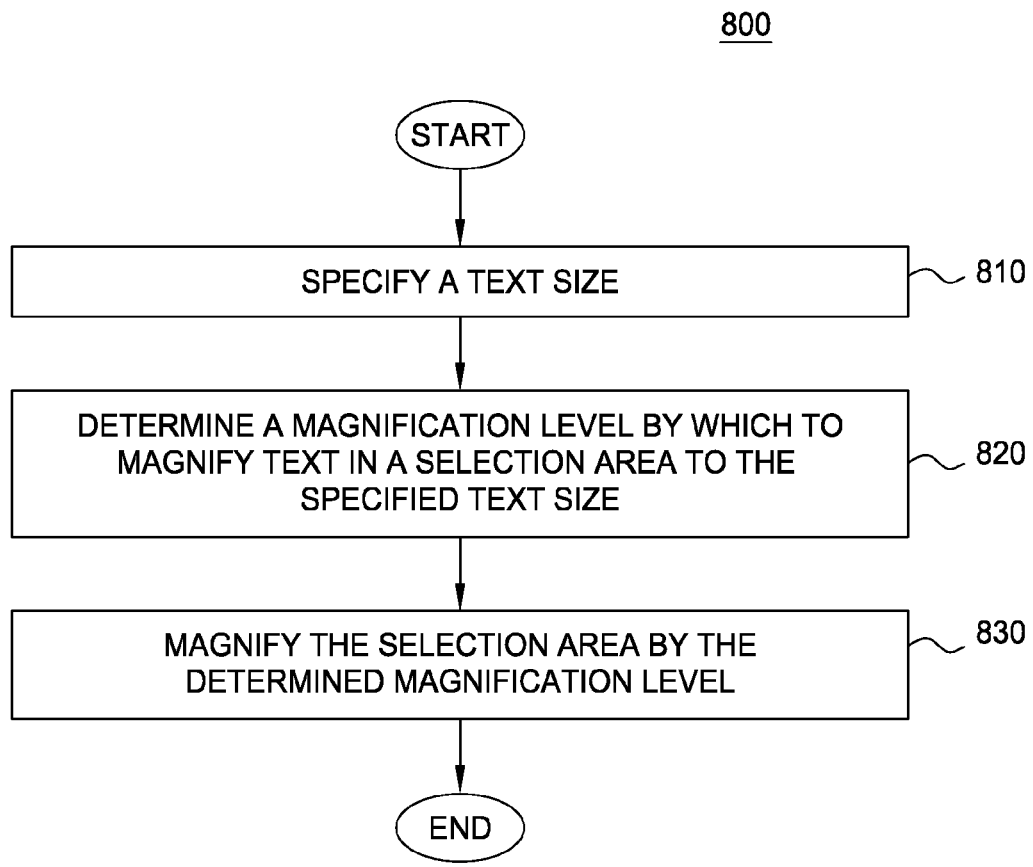
FIG. 8 is a flowchart depicting a method for adjusting a magnification level of a magnification pane for a specified text size.

FIG. 8 is a flowchart depicting a method 800 for adjusting a magnification level of a magnification pane 156 for a specified text size, according to one embodiment of the invention. The method 800 may be performed by the content magnifier 152 of FIG. 1, according to one embodiment. The steps of method 800 and are described in conjunction with the pane examples of FIG. 4.

As shown, the method 800 begins at step 810, where the frame manager 220 specifies a text size for a magnification pane 156. The text size may be specified in pixels, as a font size, etc. Furthermore, the text size may be automatically detected by the frame manager 220. For example, suppose a user selects the magnification pane 414 of FIG. 4 and requests that the magnification pane 414 maintain its current text size (for example, the user may send a request via a keystroke, such as CTRL+M). The frame manager 220 may perform a pixel analysis of the magnification pane 414 and determine that each line of text spans a maximum height of twenty-four pixels.

At step 820, the frame manager 220 determines a magnification level by which to magnify text in a selection area 154 to the specified text size. For example, the frame manager 220 may determine a magnification level for magnifying text to the specified text size (i.e., having maximum height of 24 pixels) for the magnification pane 414 of FIG. 4. In one embodiment, the frame manager 220 may perform a pixel analysis of the associated selection area 406 and determine that each line of text spans a maximum height of ten pixels. The frame manager 220 may therefore conclude that a magnification level of 2.4× (i.e., twenty-four divided by ten) is appropriate. Other ways of determining a magnification level are broadly contemplated.

At step 830, the frame manager 220 magnifies the selection area 154 by the determined magnification level. For example, the frame manager 220 magnifies the selection area 406 in FIG. 4 by 2.4×, the result of which is displayed in the associated magnification pane 414. After step 830, the method 800 terminates.

Of course, the embodiments described herein are intended to be illustrative and not limiting of the invention, and other embodiments are broadly contemplated. Those skilled in the art will recognize, for example, that embodiments of the invention may be adapted to support other ways of representing a relative location to an application window, of detecting and maintaining text size in a magnification pane, of determining a magnification level for a selection area, and of obtaining metadata for a magnification pane.

Advantageously, embodiments of the invention magnify content on a graphical display. In one embodiment, a content magnifier may specify a selection area of the graphical display to be magnified, based on user input. The content magnifier may also specify a display area of the graphical display within which to output a magnified copy of the specified selection area. Further, the content manager may anchor a specified selection area or display area to an application window or to content in an application window. For example, if a user moves an application window on the graphical display, a display area anchored to the application window moves also. The content magnifier may also specify a text size for the display area, based on user input. The content magnifier determines a magnification level by which to magnification text to the specified text size on the display area. For a display area, the content magnifier may also output metadata from an application window or from content in the application window. Further, the content magnifier may combine multiple magnification areas into a composite view.

While the foregoing is directed to embodiments of the present invention, other and further embodiments of the invention may be devised without departing from the basic scope thereof, and the scope thereof is determined by the claims that follow.

What is claimed is:

1. A computer-implemented method for magnifying content on a graphical display, the method comprising:
   receiving user input specifying a selection area of the graphical display to be magnified;
   specifying a display area of the graphical display within which to output a magnified copy of the specified selection area;
   generating the magnified copy of the specified selection area by operation of one or more computer processors; and
   outputting the magnified copy of the specified selection area within the specified display area, wherein the specified selection area remains at least partially visible on the graphical display separate from the specified display area;
   wherein a predefined area selected from the selection area and display area is anchored to a display element of an application window, such that a position of predefined area relative to the display element remains fixed when the display element is moved within the graphical display.

2. The computer-implemented method of claim 1, wherein the specified selection area includes text, and wherein the operation method further comprises:
   receiving user input specifying a text size;
   and wherein generating the magnified copy of the specified selection area comprises:
      determining a magnification level for magnifying the included text to the specified text size; and
      magnifying the specified selection area by the determined magnification level.

3. The computer-implemented method of claim 1, wherein the method further comprises:
   receiving user input specifying an application for association with the specified selection area;
   and wherein the magnified copy of the specified selection area includes metadata from the associated application.

4. The computer-implemented method of claim 1, wherein the specified selection area is smaller than the graphical display, wherein the specified display area is larger than the specified selection area but smaller than the graphical display, and wherein the specified selection area and the specified display area do not completely overlap.

5. The computer-implemented method of claim 1, wherein the predefined area is anchored based on user input.

6. The computer-implemented method of claim 1, wherein the position is specified in terms of one of: (i) a number of pixels from a reference point and (ii) a percentage of pixels from a border relative to a length of the border in pixels.

7. A computer-implemented method for magnifying content on a graphical display, the method comprising
   receiving user input specifying a plurality of selection areas of the graphical display to be magnified;
   specifying a display area of the graphical display within which to output magnified copies of the plurality of selection areas, wherein the specified display area includes a plurality of subdivisions;
   generating the magnified copies of the plurality of selection areas by operation of one or more computer processors; and
   outputting the magnified copies of the plurality of selection areas within the plurality of subdivisions of the specified display area.

8. A computer readable storage device containing a program which, when executed, performs an operation for magnifying content on a graphical display, the operation comprising:
   receiving user input specifying a selection area of the graphical display to be magnified;
   specifying a display area of the graphical display within which to output a magnified copy of the specified selection area;
   generating the magnified copy of the specified selection area by operation of one or more computer processors when executing the program; and
   outputting the magnified copy of the specified selection area within the specified display area, wherein the specified selection area remains at least partially visible on the graphical display separate from the specified display area
   wherein a predefined area selected from the selection area and display area is anchored to a display element of an application window, such that a position of predefined area relative to the display element remains fixed when the display element is moved within the graphical display.

9. The computer readable storage device of claim 8, wherein the specified selection area includes text, and wherein the operation further comprises:
   receiving user input specifying a text size;

and wherein generating the magnified copy of the specified selection area comprises:
   determining a magnification level for magnifying the included text to the specified text size; and
   magnifying the specified selection area by the determined magnification level.

10. The computer readable storage device of claim 8, wherein the operation further comprises:
   receiving user input specifying an application for association with the specified selection area;
   and wherein the magnified copy of the specified selection area includes metadata from the associated application.

11. The computer readable storage device of claim 8, wherein the specified selection area is smaller than the graphical display, wherein the specified display area is larger than the specified selection area but smaller than the graphical display, and wherein the specified selection area and the specified display area do not completely overlap.

12. The computer readable storage device of claim 8, wherein the predefined area is anchored based on user input.

13. The computer readable storage device of claim 8, wherein the position is specified in terms of one of: (i) a number of pixels from a reference point and (ii) a percentage of pixels from a border relative to a length of the border in pixels.

14. A system, comprising:
   a processor; and
   a memory containing a program which, when executed by the processor, is configured to perform an operation for magnifying content on a graphical display, the operation comprising:
      receiving user input specifying a selection area of the graphical display to be magnified;
      specifying a display area of the graphical display within which to output a magnified copy of the specified selection area;
      generating the magnified copy of the specified selection area; and
      outputting the magnified copy of the specified selection area within the specified display area, wherein the specified selection area remains at least partially visible on the graphical display separate from the specified display area
      wherein a predefined area selected from the selection area and display area is anchored to a display element of an application window, such that a position of predefined area relative to the display element remains fixed when the display element is moved within the graphical display.

15. The system of claim 14, wherein the specified selection area includes text, and wherein the operation further comprises:
   receiving user input specifying a text size;
   and wherein generating the magnified copy of the specified selection area comprises:
      determining a magnification level for magnifying the included text to the specified text size; and
      magnifying the specified selection area by the determined magnification level.

16. The system of claim 14, wherein the operation further comprises:
   receiving user input specifying an application for association with the specified selection area;
   and wherein the magnified copy of the specified selection area includes metadata from the associated application.

17. The system of claim 14, wherein the specified selection area is smaller than the graphical display, wherein the specified display area is larger than the specified selection area but smaller than the graphical display, and wherein the specified selection area and the specified display area do not completely overlap.

18. The system of claim 14, wherein the predefined area is anchored based on user input.

19. The system of claim 14, wherein the position is specified in terms of one of: (i) a number of pixels from a reference point and (ii) a percentage of pixels from a border relative to a length of the border in pixels.

20. A computer readable storage device containing a program which, when executed, performs an operation for magnifying content on a graphical display, the operation comprising:
   receiving user input specifying a plurality of selection areas of the graphical display to be magnified;
   specifying a display area of the graphical display within which to output magnified copies of the plurality of selection areas, wherein the specified display area includes a plurality of subdivisions;
   generating the magnified copies of the plurality of selection areas by operation of one or more computer processors when executing the program; and
   outputting the magnified copies of the plurality of selection areas within the plurality of subdivisions of the specified display area.

21. A system, comprising:
   a processor; and
   a memory containing a program which, when executed by the processor, is configured to perform an operation for magnifying content on a graphical display, the operation comprising:
      receiving user input specifying a plurality of selection areas of the graphical display to be magnified;
      specifying a display area of the graphical display within which to output magnified copies of the plurality of selection areas, wherein the specified display area includes a plurality of subdivisions;
      generating the magnified copies of the plurality of selection areas; and
      outputting the magnified copies of the plurality of selection areas within the plurality of subdivisions of the specified display area.

* * * * *